C. A. PARSONS & A. W. BOWERBANK.
CONTROLLING VALVE FOR MOTORS.
APPLICATION FILED MAR. 22, 1909.
962,044.
Patented June 21, 1910.
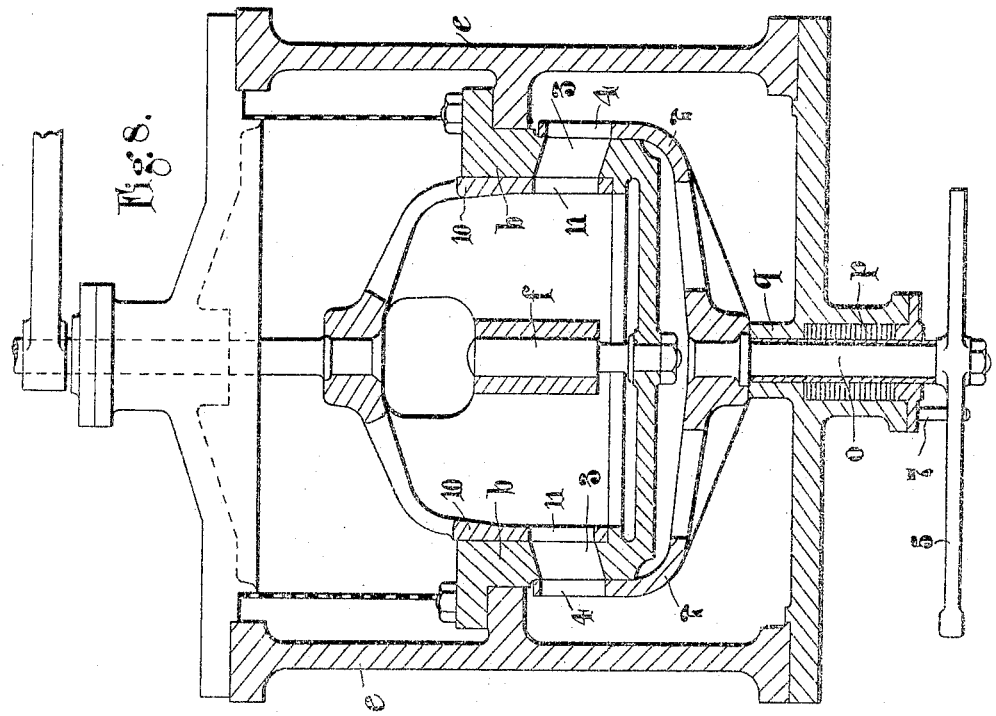
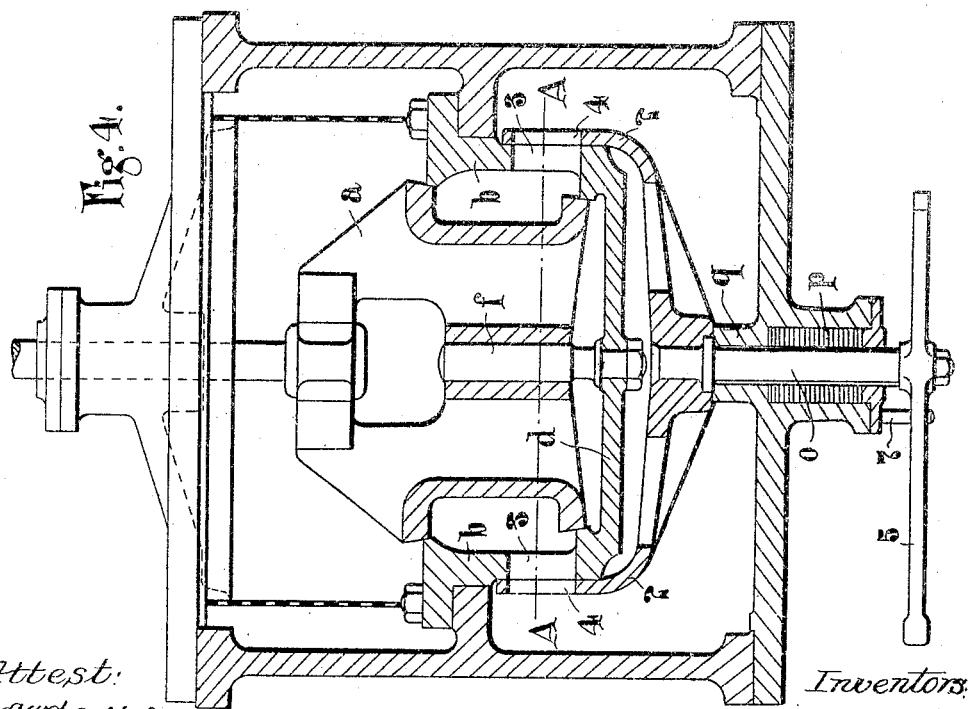

C. A. PARSONS & A. W. BOWERBANK.
CONTROLLING VALVE FOR MOTORS.
APPLICATION FILED MAR. 22, 1909.

962,044.

Patented June 21, 1910.

7 SHEETS—SHEET 5.

Figure 7:
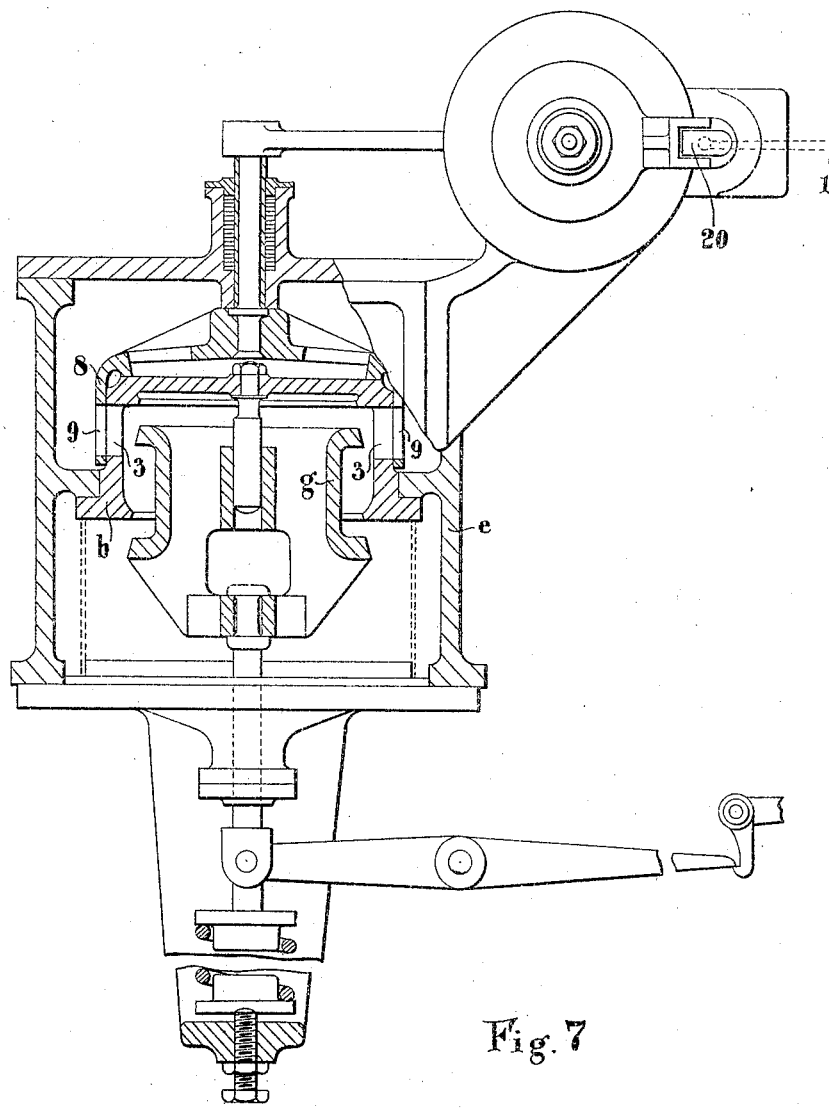

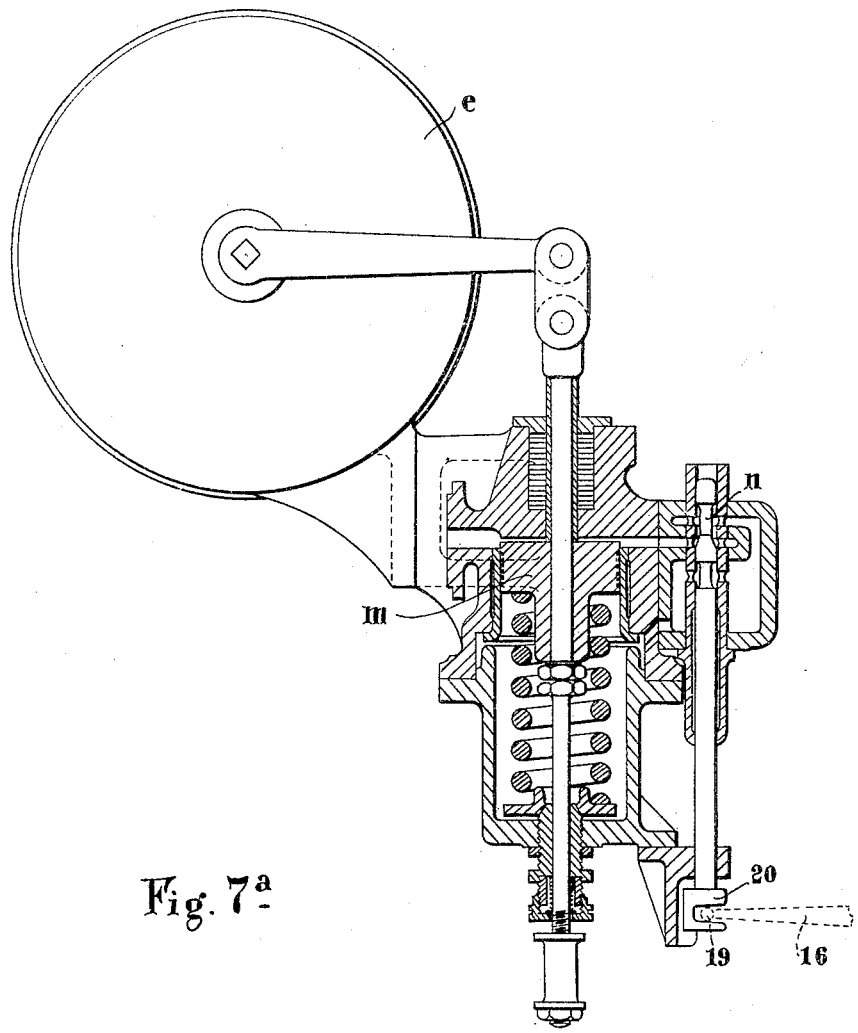
Fig. 7ª

UNITED STATES PATENT OFFICE.

CHARLES ALGERNON PARSONS AND ALBERT WILLIAM BOWERBANK, OF NEWCASTLE-UPON-TYNE, ENGLAND; SAID BOWERBANK ASSIGNOR TO SAID PARSONS.

CONTROLLING-VALVE FOR MOTORS.

962,044.  Specification of Letters Patent.  Patented June 21, 1910.

Application filed March 22, 1909. Serial No. 485,052.

*To all whom it may concern:*

Be it known that we, CHARLES ALGERNON PARSONS, C. B., and ALBERT WILLIAM BOWERBANK, subjects of the King of Great Britain and Ireland, and residing at Heaton Works, Newcastle-upon-Tyne, in the county of Northumberland, England, have invented certain new and useful Improvements in Controlling-Valves for Fluid-Operated Motors, of which the following is a specification.

This invention relates to improvements in controlling valves for fluid operated motors and it is applicable to turbines operated by steam, gas, water or other fluid and to reciprocating engines or other engines of any type in which the governing is effected by valves.

The invention is especially advantageous in the case of large valves which are necessary for steam turbines or engines of large size working with steam at low pressures such as the exhaust steam from reciprocating engines with or without live steam by-passing means.

The primary object of the invention is to enable a considerable reduction to be effected in the dimensions of the steam chest or conduit, when two valves are arranged in series, without impairing the efficient working of the valve.

A further object of the invention is to provide simple arrangements and constructions of combined regulating and emergency valves.

The invention consists in combining a regulating valve and an emergency valve in series within one chamber or conduit, the valves being concentric and automatically operated independently of one another and controlled from a common governor or from two separate governors. Both the regulating and emergency valves may be of either the reciprocating or rotary type.

The invention also consists in the improved arrangements of regulating and emergency valves hereinafter described.

In steam turbines it is usual to provide an emergency valve which comes into action when the speed of a turbine exceeds a predetermined amount and a governor valve which is intended to maintain the speed practically constant, these two valves being in series. Hitherto it has been usual to put these two valves either in one casting side by side or to place one some distance after the other in a pipe or casing. These arrangements, however, necessitated large or lengthy valve casings. By our invention we are able greatly to reduce the size of the valve casings, without in any way impairing the readiness with which the valves may be operated or the efficiency of their control.

In one way of carrying out this invention the ordinary controlling valve which is preferably of the double beat or piston type has its seat so arranged as to form a casing or seating for a second valve which may act as the emergency valve. The stem of the governor valve may, according to this form, project upward through the valve casing and the rod of the second or emergency valve may project downward. The emergency valve is held open by means of a lever and catch engaging its rod or spindle, this catch being connected to the run away governor of the motor and arranged to operate when the speed of the motor exceeds a certain predetermined limit and to enable a spring or weight at the back of the emergency valve to force the valve against its seat, thus cutting off the supply of working fluid to the motor. A dashpot may be fitted on the spindle of the emergency valve or connected to the lever operating this valve so as to prevent the valve being forced too suddenly against its seat. The emergency valve is preferably of the balanced type.

In another way of carrying out the invention instead of using reciprocating valves either or both valves may be of the rotary type, opening ports during rotation. In this modification the emergency valve may be held open by means of a lever in a similar manner to that described above, a spring or weight bringing the valve to the closed position, after a catch lever has been released by the governor. A suitable dashpot arrangement may be provided as in the former case. The emergency valves may conveniently be reset in the open position by means of a suitable hand lever.

Figure 1:
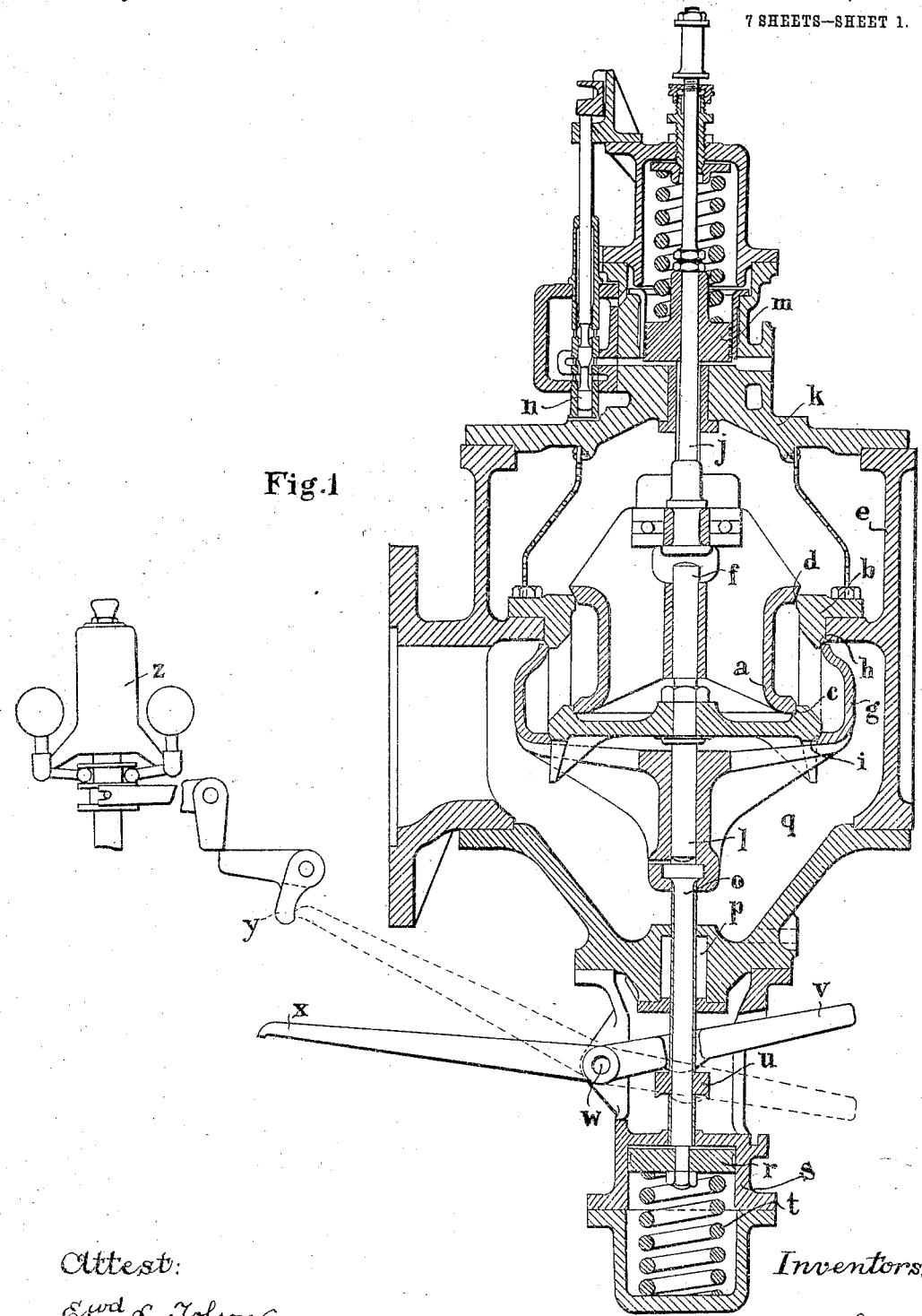
Figure 2:
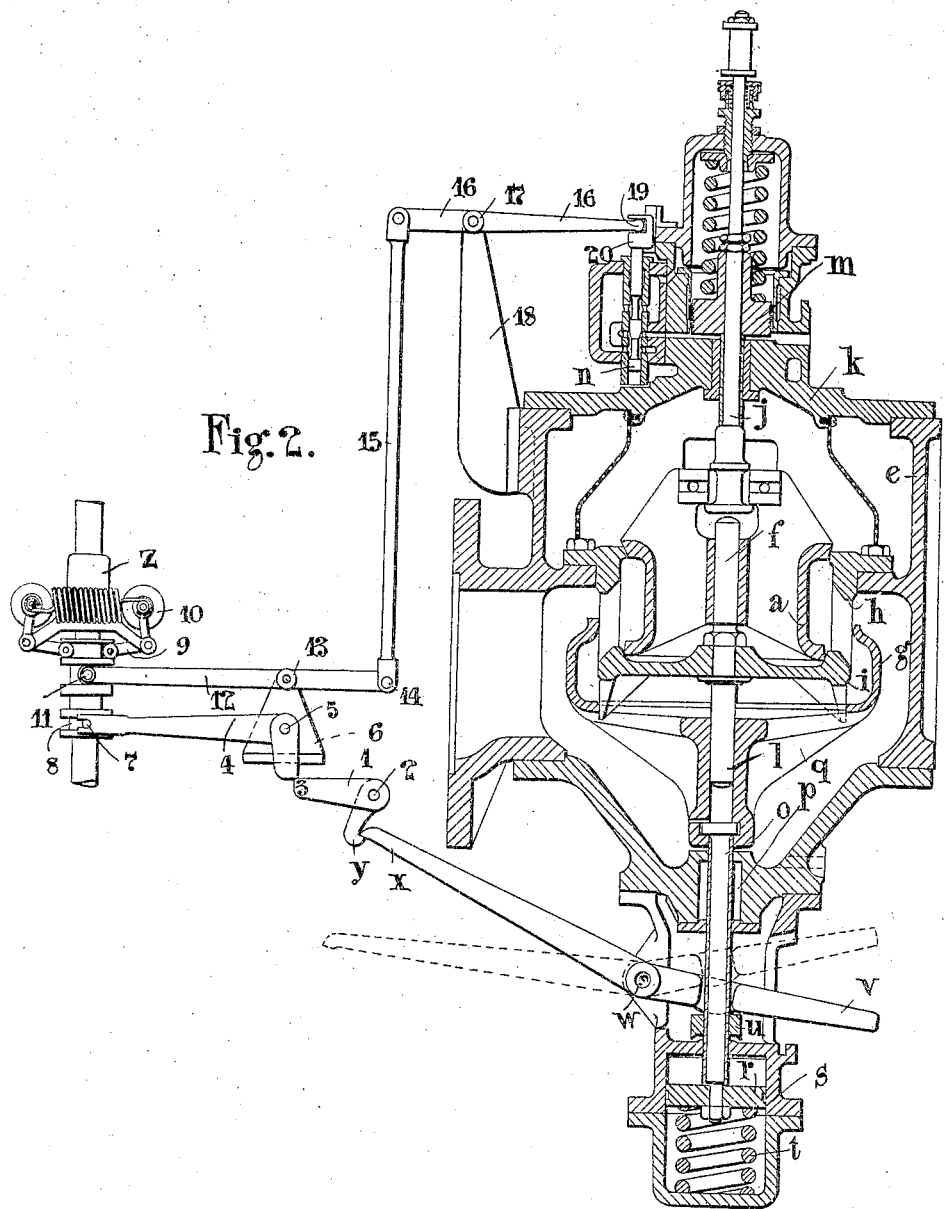
Figure 3:
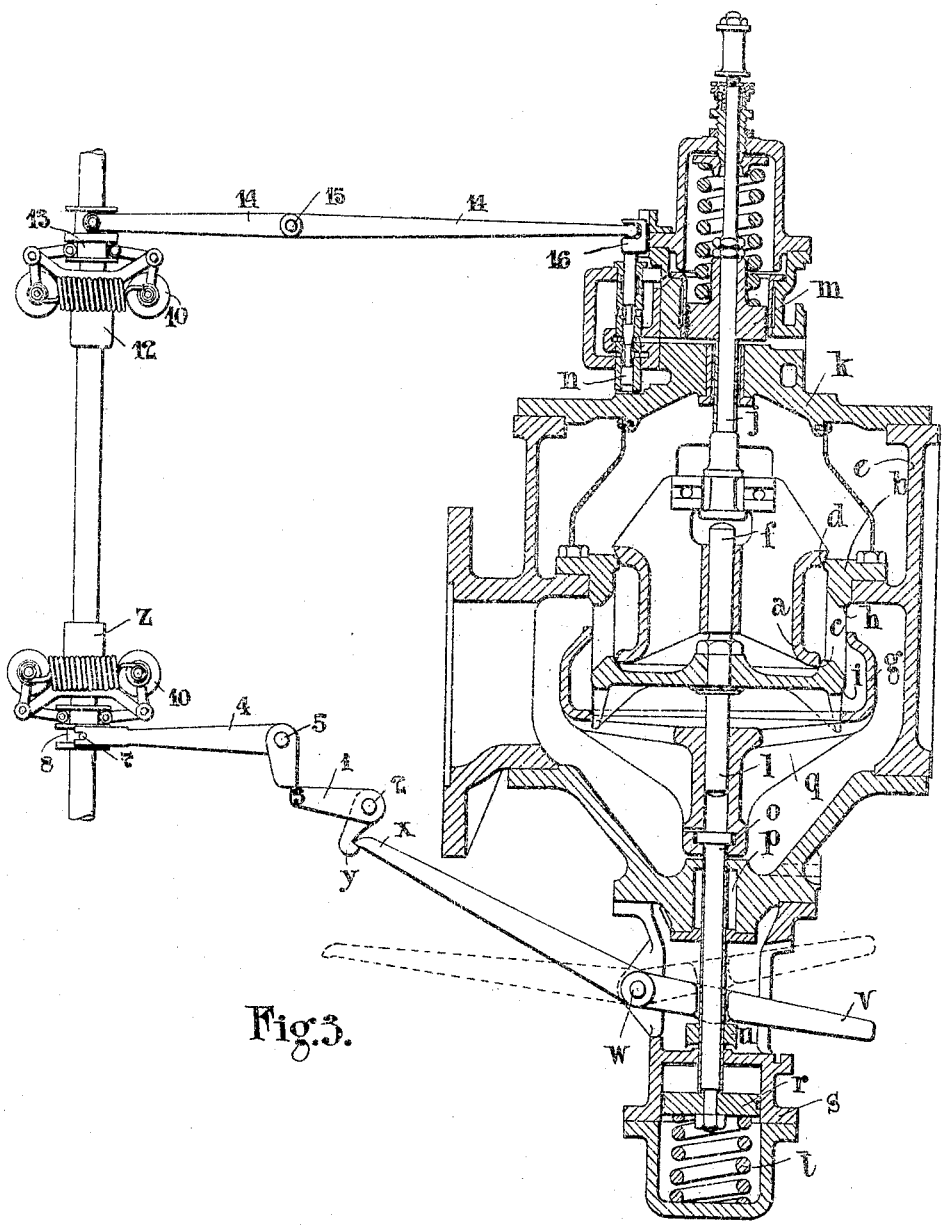
Figure 5:
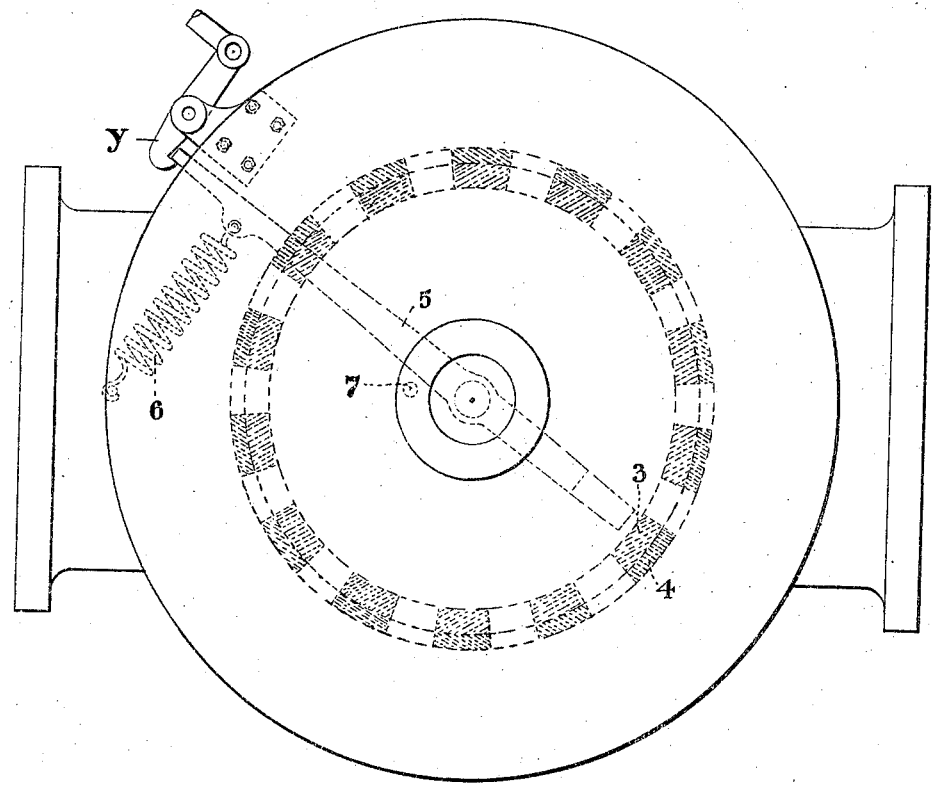
Figure 6:
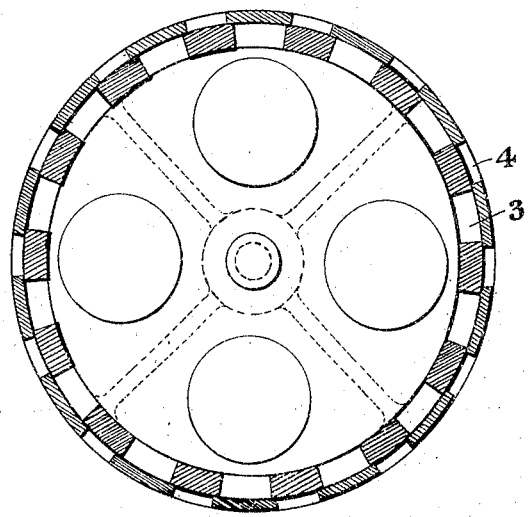

Particular forms of the invention are represented in the accompanying drawings in which, Figure 1 is a vertical sectional view of one form of a combined controlling and emergency valve. Fig. 2 is a vertical section of the same form of valve shown in Fig. 1. In this case the connections between a common governor and the valves are shown, the emergency valve being open and the regulating valve closed. Fig. 3 is similar to Fig. 2, but with the valves shown connected to two separate governors. Figs. 4 and 5 are vertical section and plan respectively of another form of valve. Fig. 6 is a cross section on the line A—A of Fig. 4. Figs. 7 and 7ª are sectional elevation and plan respectively of another form of the device while Fig. 8 is a vertical section of a final form of the device.

The reference characters in all these figures represent corresponding elements.

In the form shown in Fig. 1, we employ an ordinary controlling valve, $a$, which may conveniently be of the double beat or piston type. This valve bears on two seatings, $d$ and $c$, which may conveniently be formed in a detachable member, $b$, secured within the valve casing, $e$. In the center of the detachable member there is secured a rod having a stem, $f$, which acts as a guide for the valve, $a$, whereby that valve is steadied when under working conditions. Outside and around this detachable member there is arranged an annular double beat valve, $g$, adapted to bear on two seatings, $h$ and $i$, formed on the exterior circumference of the detachable seating member, $b$. When the valve, $a$, is operated by a relay device in a manner well known, the spindle, $j$, of the valve passes upwardly through the casing end, $k$, and carries the spring pressed piston, $m$, the steam acting on which is under the control of the relay plunger, $n$. The emergency valve, $g$, is guided by a spindle extension $l$, carried by the member, $d$. The spindle, $o$, operating the emergency valve passes downward through the bottom portion, $q$, of the valve casting and stuffing box, $p$, and has attached to its lower end a piston, $r$, working in a cylinder, $s$, which is carried by the valve casing. The piston, $r$, is pressed on its lower face by a spiral spring, $t$, in such a way that the spring tends to keep the emergency valve, $g$, in the closed position. The piston, $r$, works substantially fluid tight in its cylinder and acts as a dash pot to prevent too violent closure of the emergency valve under the action of the spring. On the spindle, $o$, between the piston, $r$, and the emergency valve, $g$, there is secured a collar, $u$, with which a lever, $v$, is adapted to engage. This lever, $v$, has its fulcrum at $w$, and its end, $x$, remote from the spindle, $o$, is adapted to engage with a catch, $y$, formed in one end of a bell crank lever, 1, pivoted at the point, 2, while the other end of the bell crank is prevented from clockwise rotation by the action of another bell crank lever, 4, controlled by the governor sleeve, 8. The lever, 4, is pivoted to a frame, 6, at the point 5, and connected to the governor sleeve, 8, by pegs, 7, projecting therein. The connection between the governor, $z$, and the regulating valve, $a$, consists of a lever, 12, pivoted to the frame, 6, at 13, and attached at one end, 11, to the governor sleeve, 8, while the other end, 14, engages with a connecting rod, 15, this connecting rod actuating a second lever, 16, which operates directly the relay valve rod, $n$. The lever, 16, is pivoted at 17, to a bracket, 18, carried by the valve casing, $e$, and has one end, 19, spherically formed in order to move within a slot formed at 20, in the relay valve rod, $n$.

The operation of the governor is as follows:—If the speed of the motor increase, the governor balls, 10, cause a vertical rise of the governor sleeve 8, this motion being transmitted by the levers, 12 and 16, to the relay valve rod, $n$, causing the latter to admit fluid under pressure to the upper side of the piston, $r$, thus closing the regulating valve, $a$. It is evident that a pulsatory motion of the valve, $a$, is caused by a variation of the motor speed. Should the change of speed be excessive, the lifting of the governor sleeve, 8, will cause the lever, 4, to trip the crank, 1, which in turn will release the lever, $x$, which has been normally tending to rotate counterclockwise under the action of the spring, $t$. The releasing of the lever, $v$, thus causes the emergency valve, $g$, to close, the piston, $r$, preventing any violent closure of the valve.

In Fig. 3, a valve combination similar to that of Figs. 1 and 2 is shown, the emergency valve and the regulating valve being in this case controlled by separate governors, $z$, and 12. The connections between the emergency valve, $g$, and the governor, $z$, are substantially as already described in connection with Fig. 2, but the regulating valve is directly connected to the relay valve rod, $n$, by a single lever, 14, pivoted at 15, one end thereof being attached to the governor sleeve, 13, and the other formed spherically to engage in a slot formed in the end, 16, of the valve rod, $n$. The operation of this governing means is evidently similar to that already described, but the separate governor means may be designed to have different degrees of sensitiveness.

In the form of the invention shown in Figs. 4, 5 and 6, the double beat valve, $a$, is arranged and operated as described with reference to Fig. 1 and bears upon a double seated member, $b$. The emergency valve however takes the form of a sleeve, 2, surrounding the detachable valve seating member, $b$, which is provided with ports, 3, with which corresponding ports, 4, on the emergency valve, 2, are adapted to register when the latter is in certain predetermined positions. The spindle, $c$, of the emergency valve passes through the lower portion, $q$, of the valve casing and a stuffing box, $p$, and is provided with an arm, 5, which is under the tension of a spring, 6, (see Fig. 5) which tends to draw the arm, 5, hard over against a stop, 7, when a catch, *y*, under the control of the governor, releases it. The stop, 7, is so arranged that when the lever, 5, bears against it the ports, 3, in the detachable member and the ports, 4, in the emergency valve do not register, that is, they then assume the positions shown in Fig. 6. It will be seen that the supply of working fluid is shut off when the lever, 5, is in engagement with the catch, *y*, for the ports, 3 and 4, now register with one another, as shown in Fig. 5. The catch mechanism, *y*, may be of any convenient kind connected through suitable means with the governor.

It is to be understood that although springs have been mentioned in the constructions described weights or the like may be employed.

In another form of the invention shown in Figs. 7 and 7ª an emergency valve, *g*, operates as described with reference to the emergency valve in Fig. 2 or 3, and bears upon a double seated member *b*. The regulating valve takes the form of a sleeve 8, surrounding the detachable valve seating member *b* which is provided with ports 3, with which corresponding ports 9, on the regulating valve 8, are adapted to register. This valve is controlled from a governor in any suitable manner, such as by the relay device shown and already described with reference to Figs. 1, 2 and 3.

In another form of the invention as shown in Fig. 8, a rotary emergency valve 2, is provided with ports 4, which ports register with corresponding ports 3, in a double valve seating member *b* and is provided with trip mechanism operated in a similar manner to the emergency valve as described with reference to Figs. 2, 3 and 4. The regulating valve consists of a rotary member 10 having ports 11, which register with the ports 3, in the double valve seating member *b*. This valve is also arranged to be controlled from a governor in any suitable manner.

Having now described our invention, what we claim as new and desire to secure by Letters Patent is:—

1. Means for controlling the supply of fluid to fluid operated motors comprising in combination a chamber, a regulating valve and an emergency valve in series within said chamber, said valves being arranged concentric within one another, a valve seating common to both said valves, separate spindles for the purpose of operating said valves, and governor means acting automatically to control said valves independently of each other.

2. Means for controlling the supply of fluid to fluid operated motors comprising in combination a chamber, a regulating valve and an emergency valve in series within said chamber, said valves being arranged concentric within one another, a valve seating common to both of said valves, separate spindles for the purpose of operating said valves, and separate governor means acting automatically to control said valves independently of one another.

3. Means for controlling the supply of fluid to fluid operated motors comprising in combination a chamber, a regulating valve and an emergency valve in series within one casing, said valves being arranged concentric within one another a valve seating common to both of said valves, separate valve operating spindles, means for giving a pulsatory motion to said regulating valve and governing means acting automatically to control said valves independently of one another.

4. Means for controlling the supply of fluid to fluid operated motors comprising in combination a chamber, a regulating valve and an emergency valve in series within said chamber, said valves being arranged concentric within one another a valve seating common to both of said valves, separate spindles extending from opposite sides or ends of said chamber for the purpose of operating said valves, and governor means acting automatically to control said valves independently of each other.

5. Means for controlling the supply of fluid to fluid operated motors comprising in combination a chamber, a regulating valve and an emergency valve in series within said chamber, said valves being arranged concentric within one another, a valve seating common to both of said valves, separate spindles extending from opposite sides or ends of said chamber for the purpose of operating said valves, and separate governor means acting automatically to control said valves independently of one another.

6. Means for controlling the supply of fluid to fluid operated motors comprising in combination a chamber, a regulating valve and an emergency valve in series within one casing, said valves being arranged concentric within one another, a valve seating common to both of said valves, separate valve operating spindles extending from opposite sides or ends of said chamber, means for giving a pulsatory motion to said regulating valve and governing means acting automatically to control said valves independently of one another.

7. Means for controlling the supply of fluid to fluid operated motors comprising in combination a chamber, a regulating valve and an emergency valve in series within said chamber, said valves being arranged concentric within one another, a valve seating common to both of said valves, separate valve operating spindles extending from opposite sides or ends of said chamber, governing means acting automatically to control said regulating valve and governing means acting automatically to close said emergency valve when the speed of the motor exceeds a predetermined limit.

8. Means for controlling the supply of fluid to fluid operated motors comprising in combination a chamber, a regulating valve and an emergency valve in series within said chamber, said valves being arranged concentric within one another a valve seating common to both of said valves, separate valve operating spindles extending from opposite sides or ends of said chamber, spring controlled operating means on said spindles, governing means acting automatically and independently to control said regulating and emergency valves through the medium of said spring means.

9. Means for controlling the supply of fluid to fluid operated motors comprising in combination a chamber, a reciprocating regulating valve, and a reciprocating emergency valve in series within said chamber, said valves being arranged concentric within one another, a valve seating common to both of said valves, separate valve operating spindles extending from opposite ends or sides of said chamber and governing means acting to automatically control said valves independently of one another.

10. Means for controlling the supply of fluid to fluid operated motors comprising in combination a chamber, a reciprocating regulating valve and a reciprocating emergency valve in series within said chamber, said valve being arranged concentric with one another, the regulating valve being placed within the emergency valve, a valve seating member carried by said chamber and adapted to form a seating for each of said valves, separate valve operating spindles extending from opposite ends or sides of said chamber and governing means acting to automatically control said valves independently of one another.

11. Means for controlling the supply of fluid to fluid operated motors comprising in combination a chamber, a reciprocating regulating valve and a reciprocating emergency valve in series within said chamber, said valves being arranged concentric within one another, a valve seating common to both of said valves, separate valve operating spindles extending from opposite ends or sides of said chamber, governing means connected to said valves and trip means between said governing means and the emergency valve, said trip means including spring means whereby the emergency valve is closed when the speed of the motor exceeds a predetermined limit.

12. Means for controlling the supply of fluid to fluid operated motors comprising in combination a chamber, a reciprocating regulating valve and a reciprocating emergency valve, in series within said chamber, said valves being arranged concentric with one another, the regulating valve being placed within the emergency valve, a valve seating member carried by said chamber and adapted to form a seating for both of said valves, a central spindle attached to said seating member, both being adapted to have vertical motion thereon, separate valve operating spindles extending from opposite ends or sides of said chamber, governing means connected to said valves and trip means between said governing means and the emergency valve, said trip means including spring means whereby the emergency valve is closed when the speed of the motor exceeds a predetermined limit.

13. Means for controlling the supply of fluid to fluid operated motors comprising in combination a chamber, a reciprocating regulating valve and a reciprocating emergency valve in series in the said chamber, said valves being placed concentric with one another, separate valve operating spindles extending from opposite sides or ends of said chamber, the regulating valve being placed within the emergency valve, a valve seating member carried by said chamber and adapted to form a seating for both of said valves, a central spindle attached to said seating member, both being adapted to have vertical motion thereon, a trip means between said emergency valve and a common governor, said means consisting in a lever controlled spring, the lever being tripped by the governor whereby the emergency valve closes on the speed of the motor rising above a predetermined limit, a spring and piston controlling the regulating valve, a relay valve actuated by the common governor to admit fluid under pressure to said piston whereby the regulating valve responds to a change of speed of the motor.

In testimony whereof, we affix our signatures in presence of two witnesses.

CHARLES ALGERNON PARSONS.
ALBERT WILLIAM BOWERBANK.

Witnesses:
FREDERICK JORDON HAY BEDFORD,
WILLIAM SHEARER.